United States Patent
Hwang et al.

(10) Patent No.: US 11,366,770 B2
(45) Date of Patent: Jun. 21, 2022

(54) STORAGE CONTROLLER MANAGING COMPLETION TIMING, AND OPERATING METHOD THEREOF

(71) Applicant: SAMSUNG ELECTRONICS CO., LTD., Suwon-si (KR)

(72) Inventors: Sangmuk Hwang, Jeonju-si (KR); Jaegeun Park, Suwon-si (KR); Hojun Shim, Seongnam-si (KR); Byungchul Yoo, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 46 days.

(21) Appl. No.: 16/983,471

(22) Filed: Aug. 3, 2020

(65) Prior Publication Data
US 2021/0191884 A1 Jun. 24, 2021

(30) Foreign Application Priority Data
Dec. 23, 2019 (KR) .................. 10-2019-0172650

(51) Int. Cl.
*G06F 13/16* (2006.01)
*G06F 13/28* (2006.01)

(52) U.S. Cl.
CPC ........ *G06F 13/1642* (2013.01); *G06F 13/161* (2013.01); *G06F 13/1689* (2013.01); *G06F 13/28* (2013.01)

(58) Field of Classification Search
CPC ................ G06F 13/1642; G06F 13/161
See application file for complete search history.

(56) References Cited

U.S. PATENT DOCUMENTS

| | | | |
|---|---|---|---|
| 8,341,374 B2 | 12/2012 | Kwon et al. | |
| 8,615,640 B2 | 12/2013 | Jibbe et al. | |
| 8,756,369 B2 | 6/2014 | McKean et al. | |
| 9,037,827 B2 | 5/2015 | Colgrove et al. | |
| 9,122,401 B2 | 9/2015 | Zaltsman et al. | |
| 9,298,376 B2 | 3/2016 | Colgrove et al. | |
| 10,051,470 B2 | 8/2018 | Abraham et al. | |
| 10,635,355 B1* | 4/2020 | Helmick | G06F 13/1668 |
| 2013/0135816 A1 | 5/2013 | Huang | |
| 2017/0075834 A1* | 3/2017 | Cha | G06F 3/0688 |
| 2018/0024949 A1 | 1/2018 | Nimmagadda | |
| 2018/0260347 A1* | 9/2018 | Benisty | G06F 3/0659 |
| 2018/0341410 A1* | 11/2018 | Benisty | G06F 3/0611 |
| 2019/0187774 A1* | 6/2019 | Yi | G11C 16/32 |

FOREIGN PATENT DOCUMENTS

| | | |
|---|---|---|
| EP | 3 499 377 A1 | 6/2019 |
| WO | 2018/175060 A1 | 9/2018 |
| WO | 2018/175065 A1 | 9/2018 |

* cited by examiner

*Primary Examiner* — David E Martinez
(74) *Attorney, Agent, or Firm* — Sughrue Mion, PLLC

(57) ABSTRACT

A method of operating a storage controller that communicates with a host including a submission queue and a completion queue is provided. The operating method includes receiving a submission queue doorbell from the host, fetching a first command including a latency from the submission queue of the host in response to the received submission queue doorbell, processing the fetched first command, and writing a first completion, which indicates that the first command is completely processed, into the completion queue of the host at a timing based on the latency.

19 Claims, 16 Drawing Sheets

FIG. 5

| bytes | | Descriptions of CMD |
| from | to | |
| --- | --- | --- |
| 00 | 03 | Command Dword 0 |
| 04 | 07 | Namespace Identifier |
| 08 | 11 | Reserved - Process Latency(PL) |
| 12 | 15 | Reserved - Interval Latency(IL) |
| 16 | 23 | Metadata Pointer |
| 24 | 39 | Data Pointer |
| 40 | 43 | Command Dword 10 |
| 44 | 47 | Command Dword 11 |
| 48 | 51 | Command Dword 12 |
| 52 | 55 | Command Dword 13 |
| 56 | 59 | Command Dword 14 |
| 60 | 63 | Command Dword 15 |

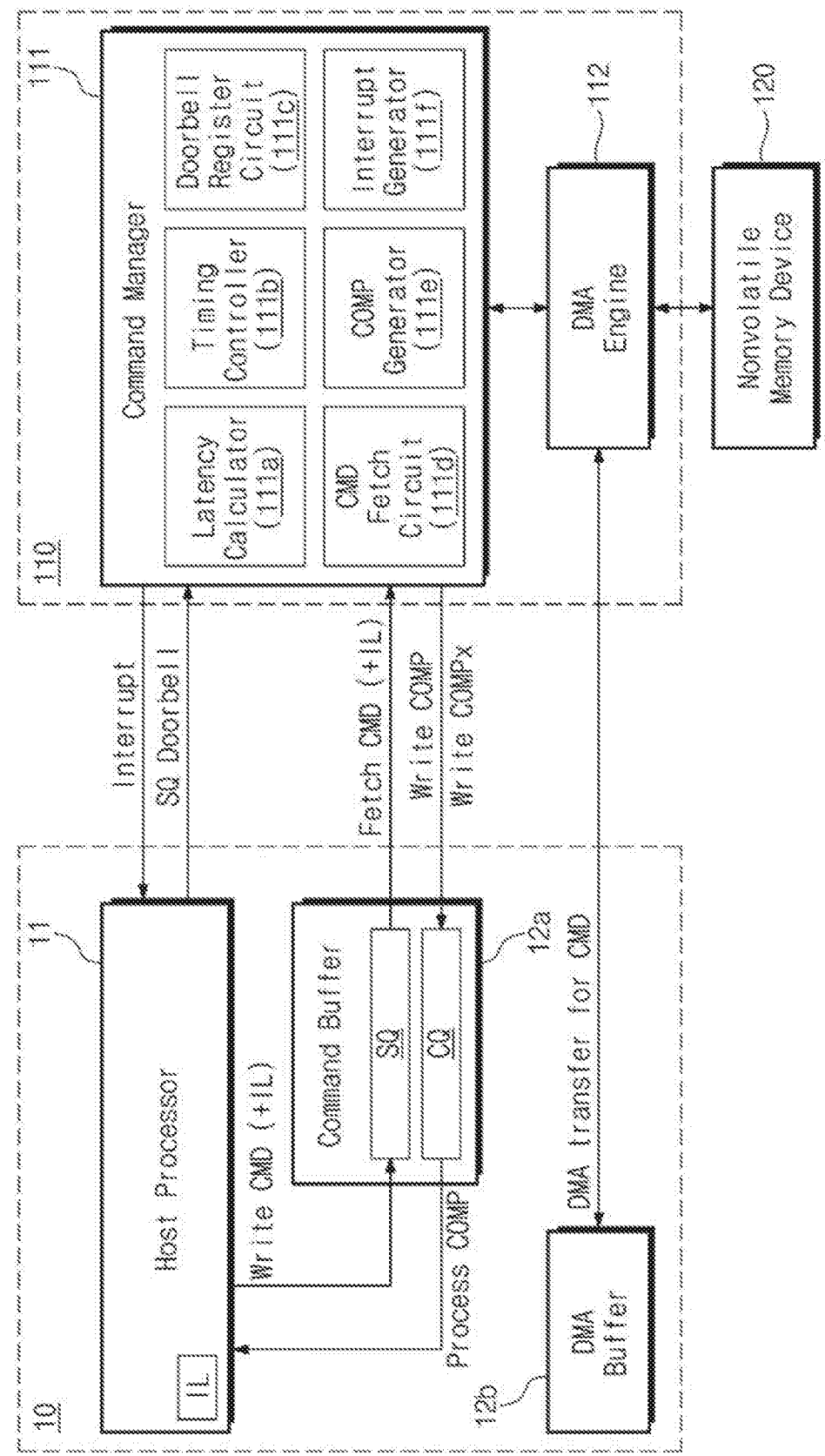

STORAGE CONTROLLER MANAGING COMPLETION TIMING, AND OPERATING METHOD THEREOF

CROSS-REFERENCE TO RELATED APPLICATIONS

This application claims priority under 35 U.S.C. § 119 to Korean Patent Application No. 10-2019-0172650 filed on Dec. 23, 2019, in the Korean Intellectual Property Office, the disclosure of which is incorporated by reference herein in its entirety.

BACKGROUND

1. Field

Methods, devices and apparatuses consistent with the present disclosure relate to a semiconductor memory, and more particularly, relate to a storage controller managing a completion timing and an operating method thereof.

2. Description of Related Art

Semiconductor memory devices are classified into a volatile memory device in which stored data disappear when power is turned off and a nonvolatile memory device in which stored data are retained even when power is turned off. As a kind of nonvolatile memory device, a flash memory is widely used as a high-capacity storage medium. Existing interfaces such as a serial advanced technology attachment (SATA) interface, a peripheral component interconnect express (PCIe) interface, and a serial attached SCSI (SAS) interface are applicable to a data storage device such as a flash memory based solid state drive (SSD), but there is a fundamental limitation on the application to the data storage device.

As such, a non-volatile memory express (NVMe) interface optimized for a nonvolatile memory-based storage device is being developed. However, as the performance of a storage device to which the NVMe interface is applied increases, the overhead of a host managing the processed data also increases. Often, this results in another process to be processed by the host being delayed while the host manages the processed data.

SUMMARY

It is an aspect to provide a storage controller managing a completion timing such that a completion is written at a timing determined based on latency information of a host, and an operating method thereof.

According to an aspect of an exemplary embodiment, there is provided a method of operating a storage controller which is configured to communicate with a host including a submission queue and a completion queue, the method comprising receiving a submission queue doorbell from the host, fetching a first command including a latency from the submission queue of the host in response to the received submission queue doorbell, processing the fetched first command, and writing a first completion, which indicates that the first command is completely processed, into the completion queue of the host at a timing based on the latency.

According to another aspect of an exemplary embodiment, there is provided a method of operating a storage controller which is configured to communicate with a host including a submission queue and a completion queue, the method comprising receiving a first submission queue doorbell and a second submission queue doorbell from the host, fetching a first command including a first latency from the submission queue of the host in response to the received first submission queue doorbell, fetching a second command including a second latency from the submission queue of the host in response to the received second submission queue doorbell, processing the fetched first command, writing a first completion, which indicates that the first command is completely processed, into the completion queue of the host at a first timing based on the first latency, processing the fetched second command, and writing a second completion, which indicates that the second command is completely processed, into the completion queue of the host at a second timing based on the second latency.

According to yet another aspect of an exemplary embodiment, there is provided a storage controller comprising a command manager that receives a first submission queue doorbell from a host, fetches a first command including a first latency from a submission queue of the host in response to the received first submission queue doorbell, and determines a first timing to write a first completion into a completion queue of the host based on the first latency, the first completion indicating that the first command is completely processed, and a direct memory access (DMA) engine that receives a request signal requesting processing of the first command from the command manager, transfers data, which the first command requests, based on a DMA transfer in response to the request signal, and outputs a complete signal, which indicates that the first command is completely processed, to the command manager.

BRIEF DESCRIPTION OF THE FIGURES

The above and other aspects will become apparent by describing in detail exemplary embodiments thereof with reference to the accompanying drawings, in which:

FIG. 5 is a diagram illustrating information of a command to be written into a submission queue in the operating method of FIG. 4, according to an embodiment;

FIG. 7A is a block diagram illustrating a storage system performing an operating method of FIG. 4, according to an embodiment;

DETAILED DESCRIPTION

Below, various embodiments will be described in detail and clearly to such an extent that an ordinary one in the art may easily implement the various embodiment.

Figure 1:
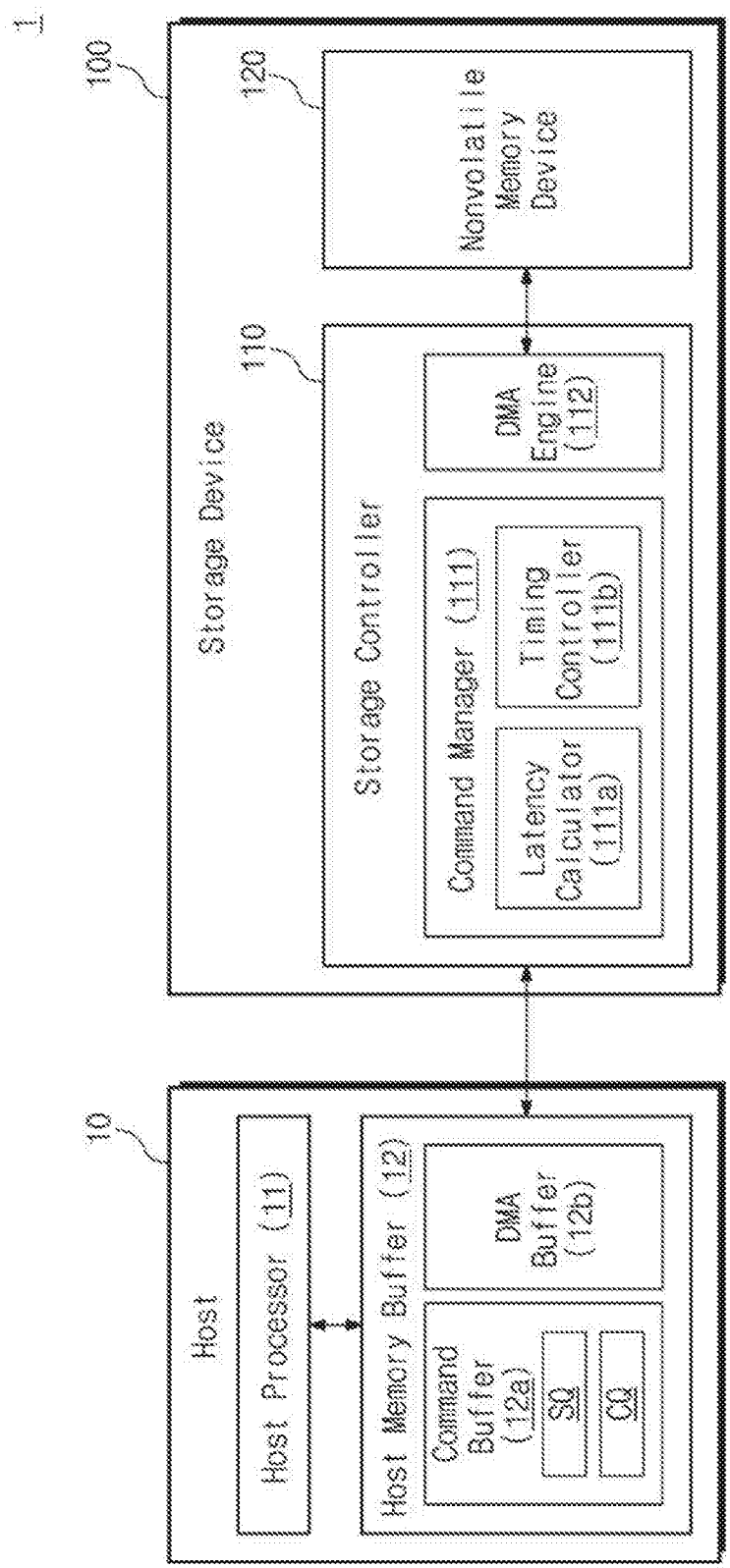
FIG. 1 is a block diagram illustrating a storage system according to an embodiment.

FIG. 1 is a block diagram illustrating a storage system according to an embodiment. Referring to FIG. 1, a storage system 1 may include a host 10 and a storage device 100. In an exemplary embodiment, the storage system 1 may be a computing system, which is configured to process various information, such as a personal computer (PC), a notebook, a laptop, a server, a workstation, a tablet PC, a smartphone, a digital camera, or a black box.

The host 10 may control overall operations of the storage system 1. For example, the host 10 may store data into the storage device 100 or may read data stored in the storage device 100. The host 10 may include a host processor 11 and a host memory buffer 12.

The host processor 11 may be a device that controls an operation of the storage system 1. For example, the host processor 11 may include a central processing unit (CPU) that outputs a command (e.g., a read command or a write command) for processing data.

The host memory buffer 12 may include a command buffer 12a and a direct memory access (DMA) buffer 12b. The host memory buffer 12 may be a device storing data that the host 10 processes. The command buffer 12a may include a submission queue SQ and a completion queue CQ. The submission queue SQ may store a command that the host processor 11 generates. The completion queue CQ may store a completion indicating that a command is completely processed.

The DMA buffer 12b may store data that are processed based on a direct memory access (DMA) transfer. The direct memory access transfer may mean that data are transferred in a direct memory access manner without intervention of the central processing unit of the host processor 11.

In an exemplary embodiment, the host processor 11 may generate latency information (hereinafter referred to as a "latency") about a time point at which the host would like to receive a completion. The host processor 11 may write a command including a latency into the submission queue SQ.

Under control of the host 10, the storage device 100 may store data or may provide the stored data into the host 10. The storage device 100 may include a storage controller 110 and a nonvolatile memory device 120.

The storage controller 110 may store data into the nonvolatile memory device 120 or may read data stored in the nonvolatile memory device 120. Under control of the storage controller 110, the nonvolatile memory device 120 may store data or may output the stored data. For example, the nonvolatile memory device 120 may include NAND flash memories storing data. The nonvolatile memory device 120 may be a device, which retains data stored therein even when power is turned off, such as a phase-change random access memory (PRAM), a magnetic RAM (MRAM), a resistive RAM (RRAM), or a ferroelectric RAM (FRAM), etc.

The storage controller 110 may include a command manager 111 and a DMA engine 112. The command manager 111 may be a device that manages a command received from the host 10. The command manager 111 may include a latency calculator 111a and a timing controller 111b. The latency calculator 111a may calculate a time point at which to write a completion, based on information of the latency included in the command. The timing controller 111b may determine a timing at which to write a completion, based on the time point calculated by the latency calculator 111a. The DMA engine 112 may perform a direct memory access operation on the command output from the host 10.

As described above, according to an embodiment, the storage system 1 managing a timing to write a completion may be provided by generating a latency including information of a time point at which to process a completion and writing the completion at a timing determined based on the latency.

Figure 2:
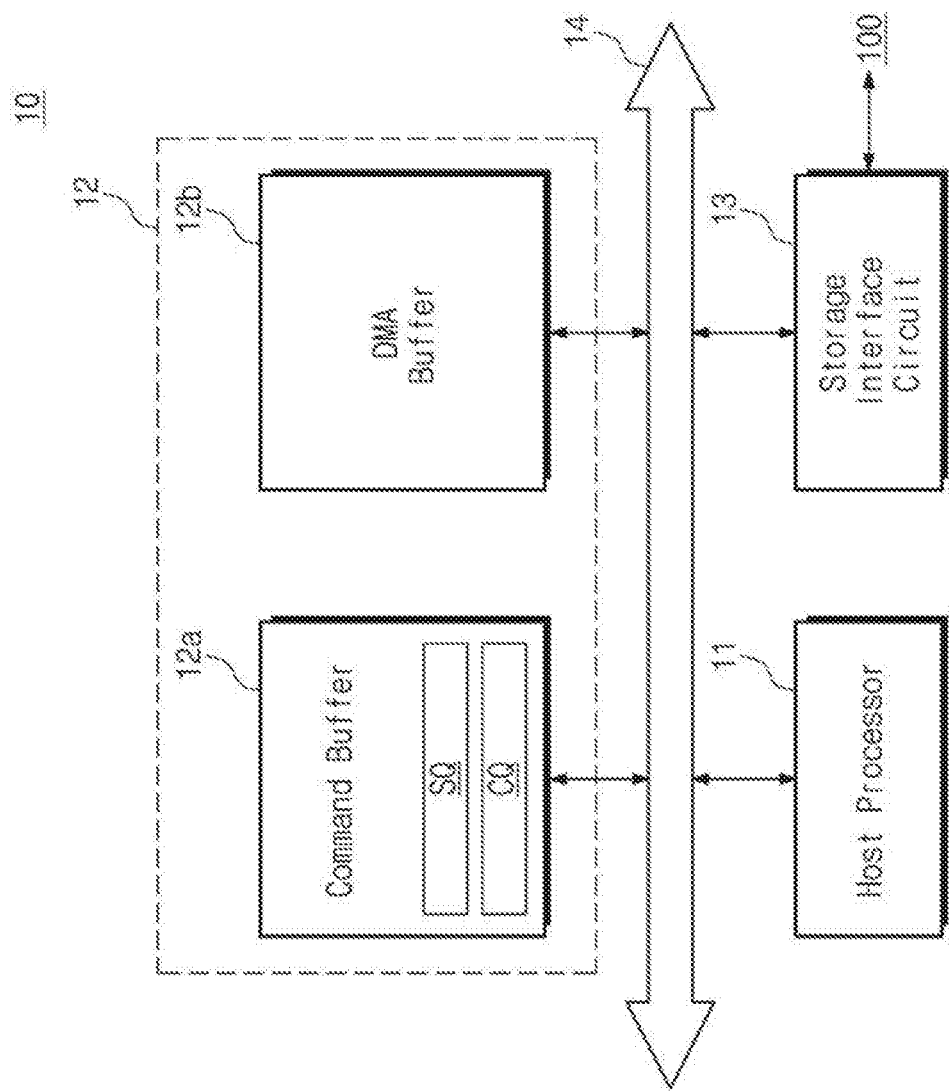
FIG. 2 is a block diagram illustrating a host of the storage system of FIG. 1, according to an embodiment.

FIG. 2 is a block diagram illustrating a host of the storage system 1 of FIG. 1, according to an embodiment. Referring to FIG. 2, the host 10 may include the host processor 11, the host memory buffer 12, a storage interface circuit 13, and a host bus 14. The host bus 14 may include a device that connects the host processor 11, the host memory buffer 12, and the storage interface circuit 13.

The host processor 11 may output a command including a latency. The host processor 11 may receive a completion indicating that a command is completely processed. The host processor 11 may perform a separate process in addition to outputting the command and receiving the completion. The host memory buffer 12 may include the command buffer 12a and the DMA buffer 12b. The command buffer 12a may include the submission queue SQ and the completion queue CQ.

The host 10 may communicate with the storage device 100 through the storage interface circuit 13. In an exemplary embodiment, the storage interface circuit 13 may be implemented to transfer a command based on a non-volatile memory express (NVMe) interface. Also, the storage interface circuit 13 may be implemented to communicate with the nonvolatile memory device 120 based on the direct memory access transfer.

Figure 3:
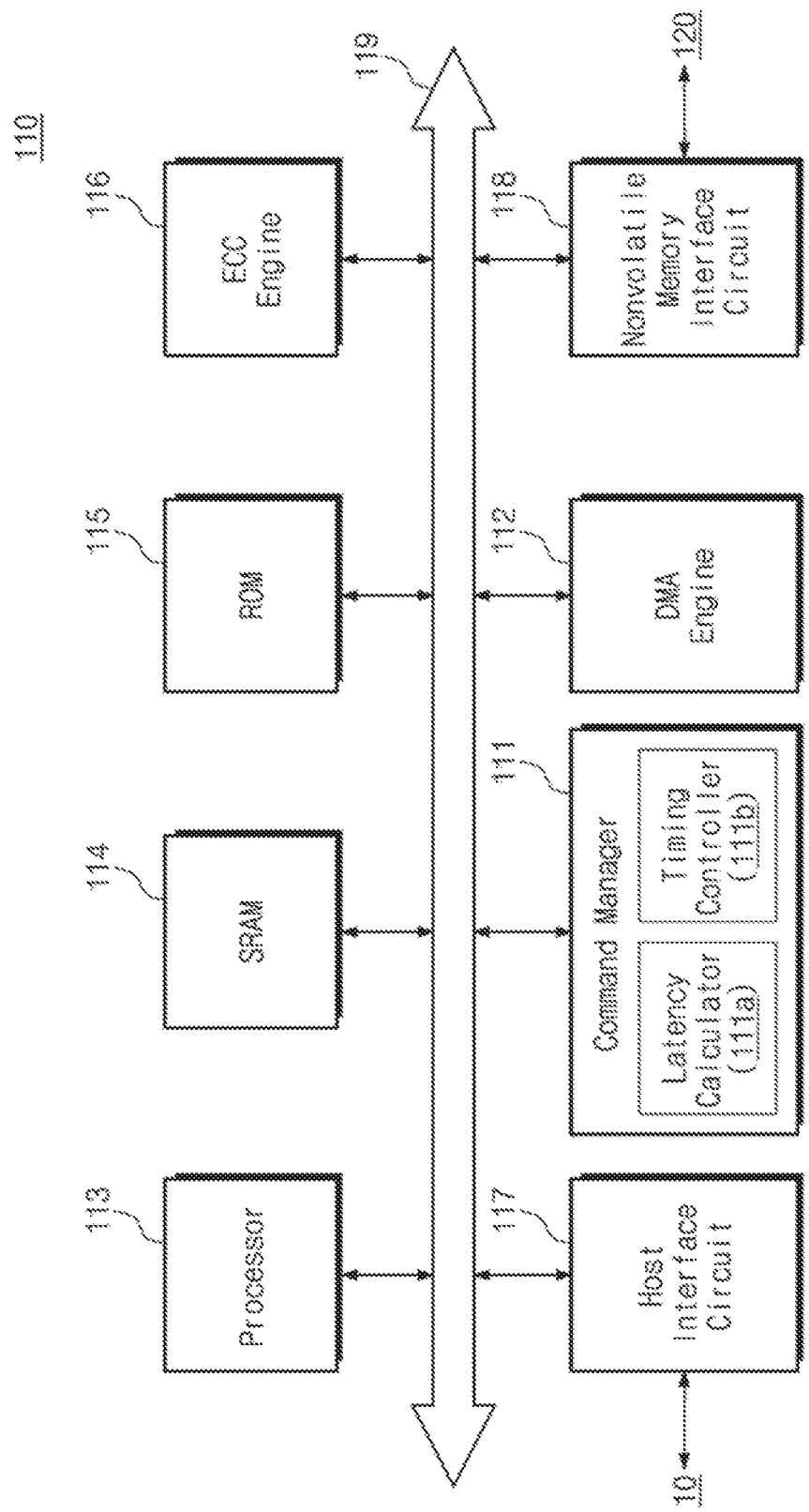
FIG. 3 is a block diagram illustrating a storage controller of the storage system of FIG. 1, according to an embodiment.

FIG. 3 is a block diagram illustrating a storage controller of the storage system 1 of FIG. 1, according to an embodiment. Referring to FIG. 3, the storage controller 110 may include the command manager 111, the DMA engine 112, a processor 113, a static random access memory (SRAM) 114, a read only memory (ROM) 115, an error correction code (ECC) engine 116, a host interface circuit 117, a nonvolatile memory interface circuit 118, and a storage controller bus 119. The storage controller bus 119 may be a device that interconnects the command manager 111, the DMA engine 112, the processor 113, the static random access memory (SRAM) 114, the read only memory (ROM) 115, the ECC engine 116, the host interface circuit 117, and the nonvolatile memory interface circuit 118 included in the storage controller 110. Characteristics of the command manager 111 and the DMA engine 112 are similar to those described with reference to FIG. 1, and thus, repeated description will be omitted for conciseness and to avoid redundancy.

The processor 113 may control overall operations of the storage controller 110. The SRAM 114 may be used as a buffer memory, a cache memory, or a working memory of the storage controller 110. The ROM 115 may store various information, which is used for the storage controller 110 to operate, in the form of firmware. The ECC engine 116 may detect and correct an error of data read from the nonvolatile memory device 120.

In an exemplary embodiment, the command manager 111 and the DMA engine 112 may be implemented in the form of software, hardware, or a combination thereof. For example, the ROM 115 may store an operating method of the command manager 111 and an operating method of the DMA engine 112. The SRAM 114 may store a command received from the host 10 and data that the DMA engine 112 processes. The processor 113 read the operating method (e.g., program code) from the ROM 115 and execute the operating method to control the command manager 111 and the DMA engine 112.

The storage controller 110 may communicate with the host 10 through the host interface circuit 117. In an exemplary embodiment, the host interface circuit 117 may be implemented to transfer a completion based on the NVMe interface. Also, the host interface circuit 117 may be implemented to communicate with the host 10 based on the direct memory access transfer.

The storage controller 110 may communicate with the nonvolatile memory device 120 through the nonvolatile memory interface circuit 118. In an exemplary embodiment, the nonvolatile memory interface circuit 118 may be implemented to communicate with the nonvolatile memory device 120 based on the direct memory access transfer.

Figure 4:
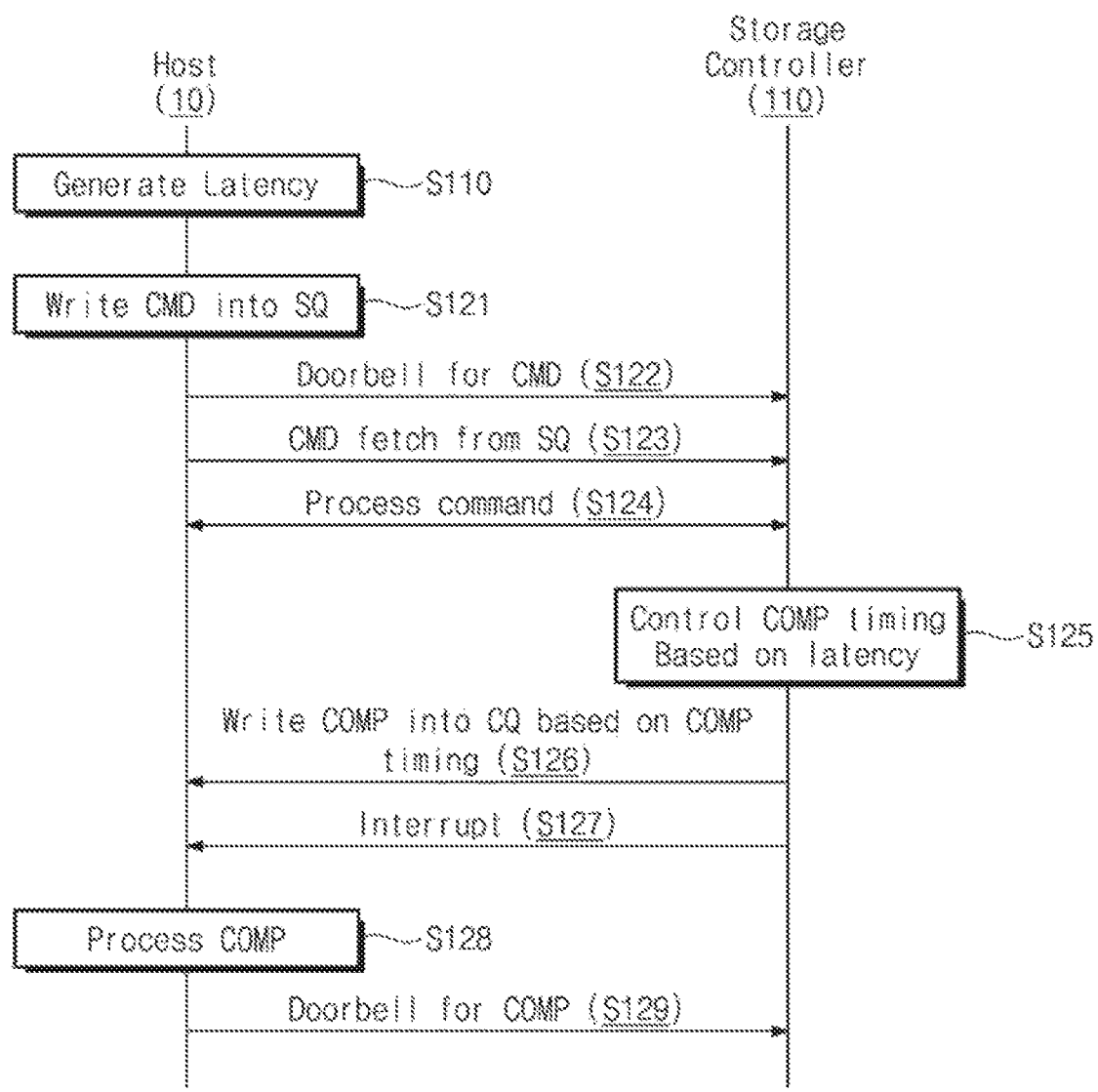
FIG. 4 is a flowchart illustrating an operating method of a storage system according to an embodiment.

FIG. 4 is a flowchart illustrating an operating method of a storage system according to an embodiment. An operating method of a storage system 1 including the host 10 and the storage controller 110 is exemplified in FIG. 4.

In operation S110, the host 10 may generate a latency. The latency may include information about a time point at which the host would like the storage controller 110 to write a completion COMP into the completion queue CQ of the host 10. The host 10 may control information about the time point included in the latency and thus may receive the completion COMP at a time point at which the influence on another process that the host 10 performs is minor. That is, the host 10 may efficiently perform any other processes by controlling the timing to receive the completion COMP.

In some exemplary embodiments, the latency may include a processing latency PL. The processing latency PL may indicate a time period from a time point when the storage controller 110 fetches a command CMD stored in the submission queue SQ to a time point when the completion COMP indicating that the command CMD is completely processed is written into the completion queue CQ. How to determine the timing based on the processing latency PL will be more fully described with reference to FIGS. 6A and 6B together.

In some exemplary embodiments, the latency may include an interval latency IL. The interval latency IL may indicate a time interval (or time period) from a time point when another completion is written into the completion queue CQ to a time point when the completion COMP is written into the completion queue CQ. In other words, the interval latency IL may indicate a time interval from one completion COMP to another completion COMP (i.e., completion to completion). In this case, an operation of writing another completion indicating that another command is completely processed into the completion queue CQ may be performed prior to an operation of writing the completion COMP indicating that the command CMD is completely processed into the completion queue CQ. How to determine the timing based on the interval latency IL will be more fully described with reference to FIGS. 7A and 7B together.

In some exemplary embodiments, the latency may include both the processing latency PL and the interval latency IL. The timing to write the completion COMP into the completion queue CQ may be determined based on the processing latency PL and the interval latency IL. This will be more fully described with reference to FIGS. 8A and 8B together.

In operation S121, the host 10 may write the command CMD into the submission queue SQ. In this case, the command CMD may include the latency generated in operation S110. The command CMD may be a command for storing data into the nonvolatile memory device 120 or for reading data stored in the nonvolatile memory device 120.

In operation S122, the host 10 may transfer a submission queue doorbell to the storage controller 110. The submission queue doorbell may be a signal indicating that the command CMD is written into the submission queue SQ. The signal indicates to the storage controller 110 that there is a command to be processed.

In operation S123, the storage controller 110 may fetch the command CMD written into the submission queue SQ in response to the submission queue doorbell received in operation S122. In this case, to fetch the command CMD may mean that the storage controller 110 retrieves the command CMD stored in the submission queue SQ. In some exemplary embodiments, the submission queue SQ may be emptied by the fetch operation of the storage controller 110. An empty state of the submission queue SQ may mean a state where a new command is capable of being written into the submission queue SQ.

In operation S124, the storage controller 110 may process the command CMD fetched in operation S123. In an exemplary embodiment, data that the command CMD requests may be transferred in the direct memory access manner.

In operation S125, the storage controller 110 may determine the timing to write the completion COMP into the completion queue CQ, based on the latency included in the command CMD fetched in operation S123. In some exemplary embodiments, operation S125 may be performed in parallel with operation S124.

In operation S126, the storage controller 110 may write the completion COMP into the completion queue CQ, based on the timing determined in operation S125. In this case, operation S126 may be performed after the processing (S124) of the fetched command CMD is completed.

In operation S127, the storage controller 110 may generate an interrupt informing the host 10 that the completion COMP is written into the completion queue CQ. The storage controller 110 may output the generated interrupt to the host 10. In some exemplary embodiments, the storage controller 110 may generate an interrupt indicating that a plurality of completions are written into a plurality of completion queues, i.e., a batch interrupt. For example, instead of outputting an interrupt immediately after performing operation S126, the storage controller 110 may output an interrupt after another completion is written into the completion queue CQ.

In operation S128, the host 10 may process the completion COMP in response to the interrupt received in operation S127. The host 10 may obtain information indicating that the operation requested by the command CMD in operation S121 is completed. In an exemplary embodiment, the host 10 may empty the completion queue CQ corresponding to the interrupt. An empty state of the completion queue CQ may mean a state where a new completion is capable of being written into the completion queue CQ. The host 10 may allocate another command to the submission queue SQ and the completion queue CQ corresponding to the command CMD in operation S121.

In operation S129, the host 10 may generate a completion queue doorbell informing the storage controller 110 that the completion COMP written into the completion queue CQ is processed. The host 10 may output the generated completion queue doorbell to the storage controller 110. In an exemplary embodiment, the storage controller 110 receiving the completion queue doorbell may write another completion indicating that a command different from the command CMD is completely processed into the completion queue CQ.

As described above, according to an embodiment, there may be the operating method of the storage system that writes the completion COMP into the completion queue CQ at the timing determined based on the latency generated by the host 10. Also, there may be provided the operating method of the storage system that manages the timing to write the completion COMP based on the NVMe interface.

FIG. 5 is a diagram illustrating information of a command to be written into a submission queue in the operating method of FIG. 4, according to an embodiment. Information of the command CMD generated by the host 10 is exemplified in FIG. 5. The command CMD may have an area/size of a given capacity. For example, the command CMD may have a 64-byte capacity. The general command CMD may include a reserved area being an area not associated with data processing. For example, the reserved area may be an area from Byte 8 to Byte 15, in the example illustrated in FIG. 5.

According to an embodiment, a storage system 1 that includes a latency in the reserved area may be provided. For example, in some exemplary embodiments, an area, which corresponds to a range from Byte 8 to Byte 11, of the reserved area of the command CMD may include the processing latency PL. In some exemplary embodiments, an area, which corresponds to a range from Byte 12 to Byte 15, of the reserved area of the command CMD may include the interval latency IL. However, this is only an example, and as discussed above, in some exemplary embodiments, only one of the processing latency PL or the interval latency IL may be provided. Moreover, in some exemplary embodiments, the specific bytes of the command CMD assigned to the processing latency PL and the interval latency IL may be different from those illustrated in FIG. 5.

Figure 6A:
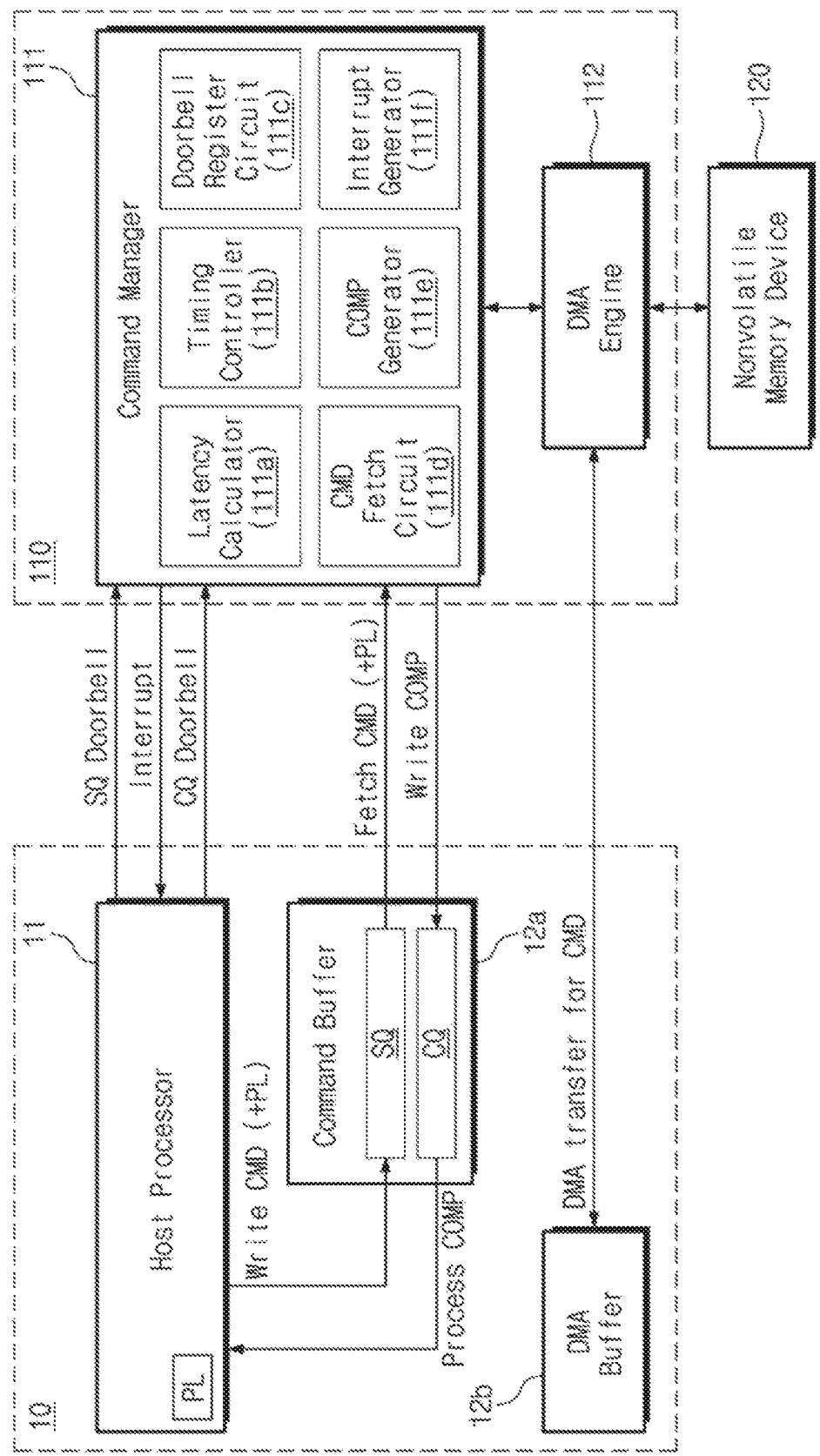
FIG. 6A is a block diagram illustrating a storage system performing an operating method of FIG. 4, according to an embodiment.

FIG. 6A is a block diagram illustrating a storage system performing an operating method of FIG. 4, according to an embodiment. A storage system that determines the timing based on the processing latency PL is exemplified in FIG. 6A. The storage system may include the host 10, the storage controller 110, and the nonvolatile memory device 120.

The host 10 may include the host processor 11, the command buffer 12a, and the DMA buffer 12b. The command buffer 12a may include the submission queue SQ storing the command CMD and the completion queue CQ storing the completion COMP.

The host processor 11 may generate the processing latency PL. The processing latency PL may indicate a time period from a time point when the storage controller 110 fetches the command CMD stored in the submission queue SQ to a time point when the storage controller 110 writes the completion COMP indicating that the command CMD is completely processed into the completion queue CQ.

The host processor 11 may write the command CMD including the processing latency PL into the submission queue SQ. The host processor 11 may output the submission queue SQ doorbell indicating that the command CMD is written into the submission queue SQ to the command manager 111.

The host processor 11 may process the completion COMP stored in the completion queue CQ in response to an interrupt received from the command manager 111. The host processor 11 may output the completion queue CQ doorbell indicating that the completion COMP written into the completion queue CQ has processed by the host to the command manager 111.

The command manager 111 may include the latency calculator 111a, the timing controller 111b, a doorbell register circuit 111c, a command fetch circuit 111d, a completion generator 111e, and an interrupt generator 111f.

The latency calculator 111a may calculate a time point at which to write the completion COMP, based on the processing latency PL included in the command CMD. In an exemplary embodiment, the latency calculator 111a may calculate the time point at which to write the completion COMP by adding a time period corresponding to the processing latency PL from a time point when the command CMD is fetched. The timing controller 111b may determine the timing to write the completion COMP, based on the time point calculated by the latency calculator 111a.

The doorbell register circuit 111c may receive the submission queue SQ doorbell and the completion queue CQ doorbell from the host processor 11. The doorbell register circuit 111c may control the command fetch circuit 111d to fetch the command CMD in response to the submission queue doorbell. In response to the completion queue CQ doorbell, the doorbell register circuit 111c may output a signal indicating that the completion queue CQ is empty to the completion generator 111e.

The command fetch circuit 111d may fetch the command CMD stored in the submission queue SQ under control of the doorbell register circuit 111c. The command fetch circuit 111d may output a signal, which requests the DMA engine 112 to process data, based on the fetched command CMD.

The completion generator 111e may receive, from the DMA engine 112, a signal indicating that data corresponding to the command CMD are completely processed. The completion generator 111e may generate the completion COMP in response to the signal indicating that the data are completely processed. The completion generator 111e may write the completion COMP into the completion queue CQ, based on the timing determined by the timing controller 111b. The completion generator 111e may output, to the interrupt generator 111f, a signal indicating that the completion COMP is written.

The interrupt generator 111f may generate an interrupt in response to the signal indicating that the completion COMP is written. The interrupt generator 111f may output the generated interrupt to the host processor 11.

The DMA engine 112 may receive a request signal requesting data processing from the command fetch circuit 111d. The DMA engine 112 may be connected with the DMA buffer 12b and the nonvolatile memory device 120.

Without a direct control of the host processor 11, the DMA engine 112 may store data into the nonvolatile memory device 120 or may read data stored in the nonvolatile memory device 120. That is, data corresponding to the command CMD may be processed between the DMA buffer 12b and the nonvolatile memory device 120 based on the direct memory access transfer. After completing processing of the data corresponding to the command CMD, the DMA engine 112 may output a complete signal indicating a completion of the data processing to the completion generator 111e.

As described above, according to an embodiment, a storage system in which the processing latency PL is generated by the host 10 and the completion COMP is written at the timing determined based on the processing latency PL may be provided.

Figure 6B:
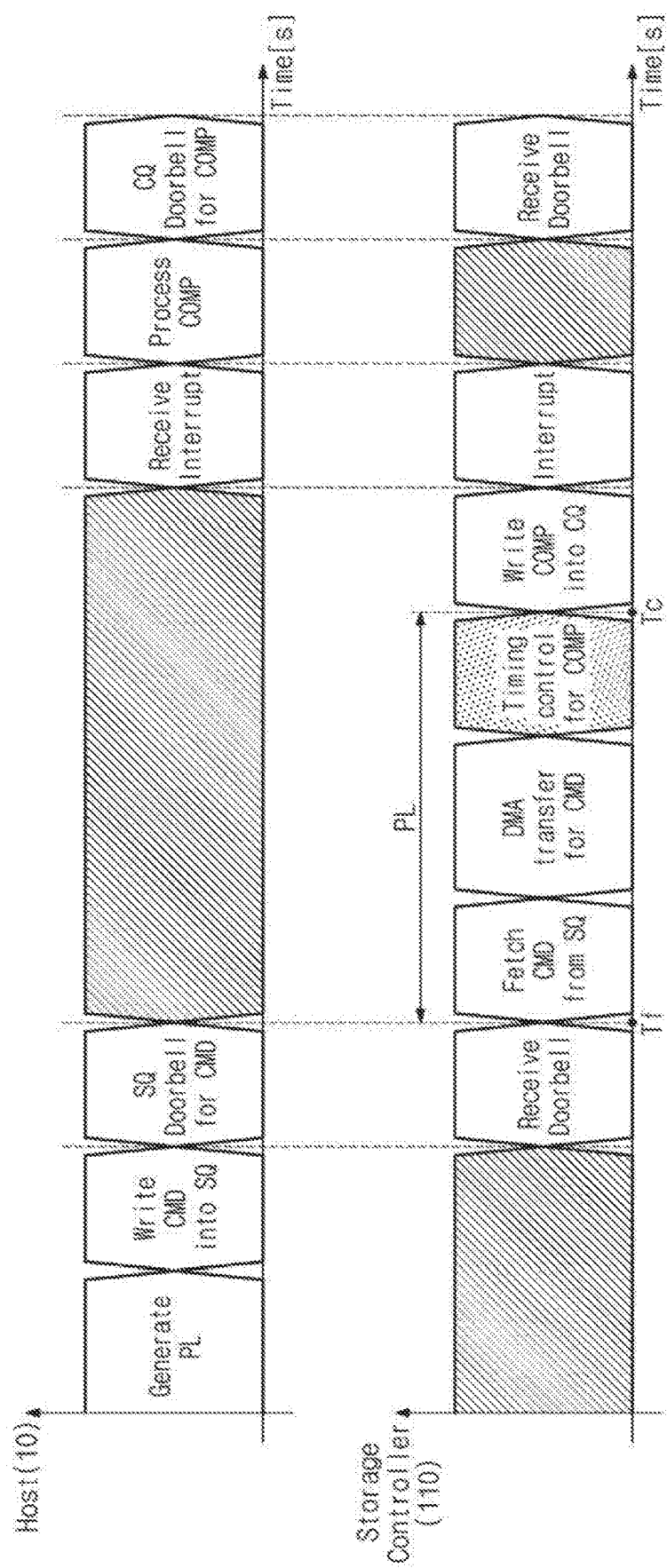
FIG. 6B is a timing diagram illustrating a process of a host and a storage controller of the storage system of FIG. 6A, according to an embodiment.

FIG. 6B is a timing diagram illustrating a process of a host and a storage controller of the storage system performing the operation method of FIG. 6A, according to an embodiment. Referring to FIGS. 6A and 6B, the host 10 may sequentially perform the following: generating the processing latency PL, writing the command CMD into the submission queue SQ, and outputting the submission queue SQ doorbell indicating that the command CMD is written.

The storage controller 110 may sequentially perform the following: receiving the submission queue SQ doorbell, fetching the command CMD, and processing data requested by the command CMD based on the direct memory access transfer. In this case, instead of writing the completion COMP immediately after data processing is completed as in a related art storage system, the storage controller 110 may write the completion COMP at a completion time point Tc determined based on the processing latency PL. In other words, the storage controller 110 may delay writing the completion COMP until the host 10 is ready to receive the completion COMP. The completion time point Tc determined based on the processing latency PL may be a time point at which the time period corresponding to the processing latency PL elapses from a fetch time point Tf when the command CMD is fetched from the submission queue SQ. At the completion time point Tc, the storage controller 110 may write the completion COMP into the completion queue CQ.

The storage controller 110 may output an interrupt after the storage controller 110 writes the completion COMP into the completion queue CQ at the completion time point Tc. The host 10 may receive the interrupt and process the completion COMP written into the completion queue CQ after receiving the interrupt. The host 10 may output the completion queue CQ doorbell and the storage controller 110 may receive the CQ doorbell. In this case, a time point when the host 10 processes the completion COMP may be a time point determined before the host 10 writes another command CMD into the submission queue SQ. As the host 10 controls the time point to process the completion COMP accurately, the host 10 may perform another process without hindrance before processing the completion COMP.

FIG. 7A is a block diagram illustrating a storage system performing an operating method of FIG. 4, according to an embodiment. A storage system that determines the timing based on the interval latency IL is exemplified in FIG. 7A. Characteristics of the DMA buffer 12b, the timing controller 111b, the doorbell register circuit 111c, the command fetch circuit 111d, the completion generator 111e, the interrupt generator 111f, the DMA engine 112, and the nonvolatile memory device 120 are similar to those described with reference to FIG. 6A, and thus, repeated description will be omitted for conciseness and to avoid redundancy.

The host 10 may include the host processor 11, the command buffer 12a, and the DMA buffer 12b. The command buffer 12a may include the submission queue SQ further storing another command (hereinafter referred to as a "previous command") and the completion queue CQ further storing another completion (hereinafter referred to as a "previous completion"). In this case, another completion COMPx (hereinafter referred to as a "previous completion COMPx") may indicate that the previous command is completely processed.

The host processor 11 may generate the interval latency IL. The interval latency IL may indicate a time interval (or, time period) from a time point when the previous completion COMPx is written into the completion queue CQ to a time point when the completion COMP is written into the completion queue CQ. In this case, an operation of writing the previous completion COMPx may be performed prior to an operation of writing the completion COMP.

The host processor 11 may write the command CMD including the interval latency IL into the submission queue SQ. The host processor 11 may output the submission queue SQ doorbell indicating that the command CMD is written into the submission queue SQ to the command manager 111.

The latency calculator 111a may calculate a time point to write the completion COMP, based on the interval latency IL included in the command CMD. In an exemplary embodiment, the latency calculator 111a may calculate the time point to write the completion COMP by adding a time period corresponding to the interval latency IL from a time point to write the previous completion COMPx.

As described above, according to an embodiment, a storage system that writes the completion COMP at the timing determined based on the interval latency IL may be provided.

Figure 7B:
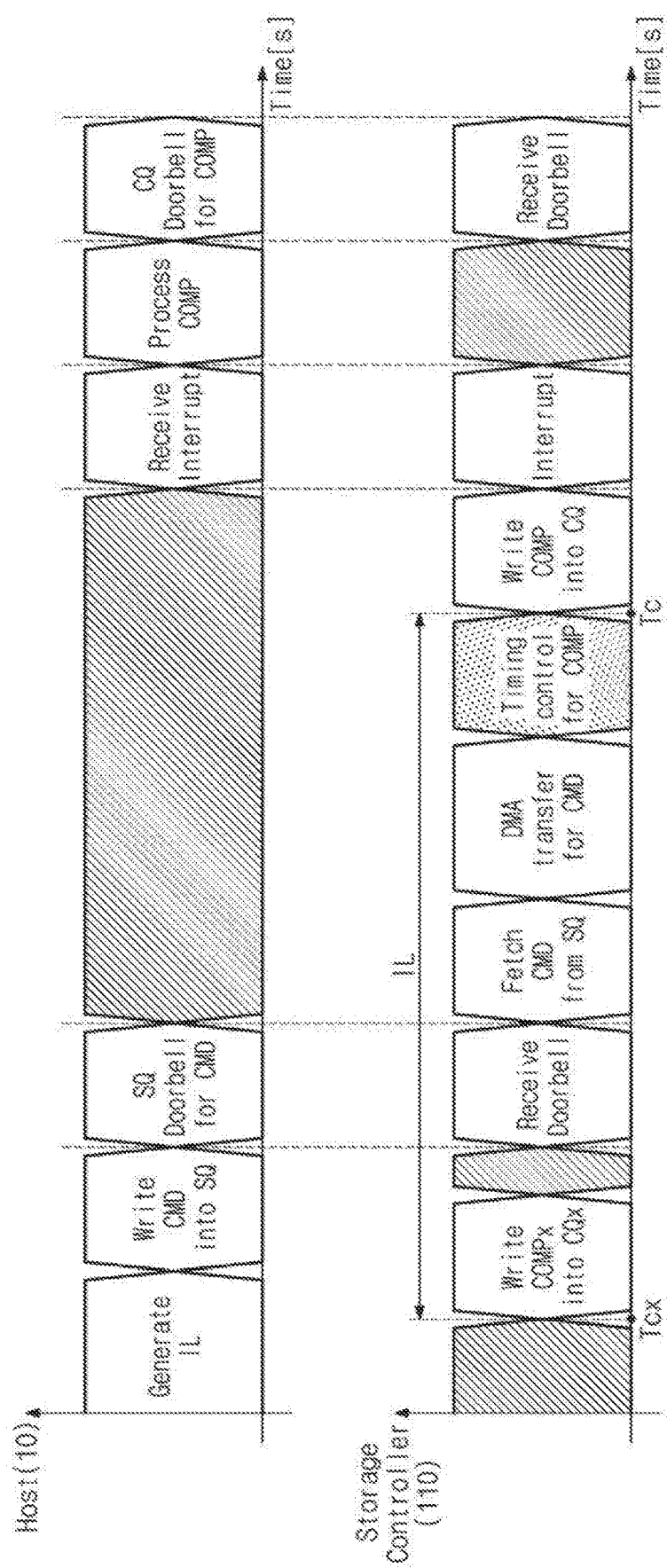
FIG. 7B is a timing diagram illustrating a process of a host and a storage controller of the storage system of FIG. 7A, according to an embodiment.

FIG. 7B is a timing diagram illustrating a process of a host and a storage controller of the storage system performing the operating method of FIG. 7A, according to an embodiment. Referring to FIGS. 7A and 7B, the host 10 may sequentially perform the following: generating the interval latency IL, writing the command CMD into the submission queue SQ, and outputting the submission queue SQ doorbell indicating that the command CMD is written.

The storage controller 110 may write the previous completion COMPx at another completion time point Tcx (hereinafter referred to a "previous completion time point Tcx"). The previous completion time point Tcx may be a time point that is determined based on another latency that the host 10 generates. In other words, the previous completion time point Tcx may be a time point that is determined based on a previous latency for a previous command that the host 10 generated (for example, a command generated previously with a processing latency PL as illustrated in FIGS. 6A and 6B). The storage controller 110 may sequentially perform the following: receiving the submission queue SQ doorbell, fetching the command CMD, and processing data requested by the command CMD based on the direct memory access transfer.

In this case, instead of writing the completion COMP immediately after data processing is completed, the storage controller 110 may write the completion COMP at the completion time point Tc determined based on the interval latency IL. The completion time point Tc determined based on the interval latency IL may be a time point when the time period corresponding to the interval latency IL elapses from the previous completion time point Tcx. The storage controller 110 may write the completion COMP at time point Tc thus determined.

The storage controller 110 may output an interrupt after the storage controller 110 writes the completion COMP into the completion queue CQ at the completion time point Tc. The host 10 may receive the interrupt and process the completion COMP written into the completion queue CQ after receiving the interrupt. The host 10 may output the completion queue CQ doorbell and the storage controller 110 may receive the CQ doorbell. In this case, a time point when the host 10 processes the completion COMP may be a time point determined before the host 10 writes another command CMD into the submission queue SQ. As the host 10 controls the time point to process the completion COMP accurately, the host 10 may perform another process without hindrance after processing the previous completion COMPx and before processing the completion COMP. Alternatively, the interval latency IL may be adjusted depending on a time point taken to perform another process.

Figure 8A:
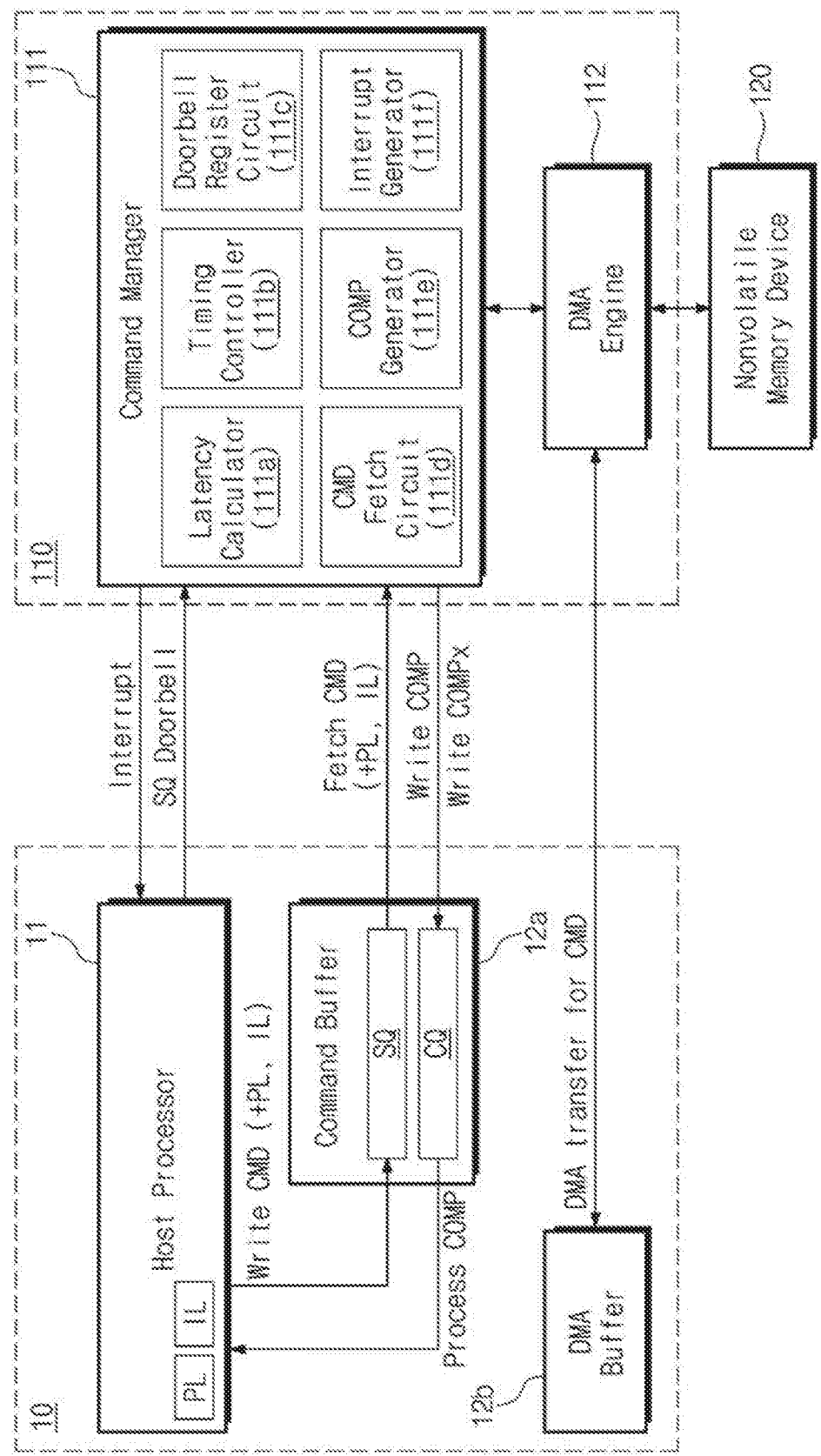
FIG. 8A is a block diagram illustrating a storage system performing an operating method of FIG. 4, according to an embodiment.

FIG. 8A is a block diagram illustrating a storage system performing an operating method of FIG. 4, according to an embodiment. A storage system that determines the timing based on the processing latency PL and the interval latency IL is exemplified in FIG. 8A. Characteristics of the DMA buffer 12b, the timing controller 111b, the doorbell register circuit 111c, the command fetch circuit 111d, the completion generator 111e, the interrupt generator 111f, the DMA engine 112, and the nonvolatile memory device 120 are similar to those described with reference to FIG. 6A, and thus, repeated description will be omitted for conciseness and to avoid redundancy.

The host processor 11 may generate the processing latency PL and the interval latency IL. The host processor 11 may write the command CMD including the processing latency PL and the interval latency IL into the submission queue SQ. The host processor 11 may output the submission queue SQ doorbell indicating that the command CMD is written into the submission queue SQ to the command manager 111.

The latency calculator 111a may calculate a time point to write the completion COMP, based on the processing latency PL and the interval latency IL included in the command CMD. In some exemplary embodiments, the latency calculator 111a may calculate a first time point Tcp by adding a time period corresponding to the processing latency PL from a time point Tf when the command CMD is fetched. The latency calculator 111a may calculate a second time point Tci by adding a time period corresponding to interval latency IL from a time point Tcx at which the previous completion COMPx was written.

The timing controller 111b may determine the timing to write the completion COMP, based on the first time point Tcp and the second time point Tci calculated by the latency calculator 111a. In some exemplary embodiments, when the first time point Tcp and the second time point Tci are identical, the timing controller 111b may determine the first time point Tcp which is equal to the second time point Tci as the timing to write the completion COMP.

In some exemplary embodiments, when the second time Tci point lags behind the first time point Tcp, the timing controller 111b may determine the second time point Tci as the timing to write the completion COMP. This is illustrated in the example of FIG. 8B.

Figure 8B:
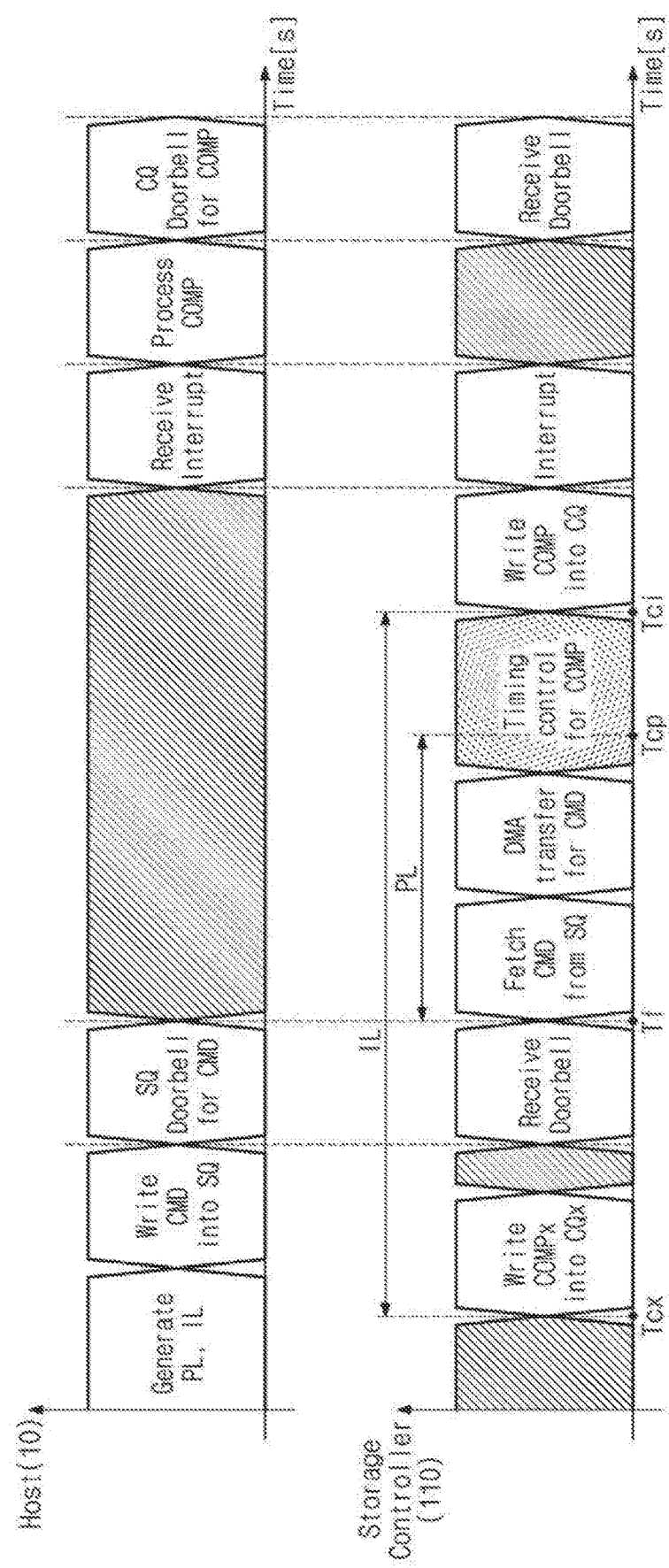
FIG. 8B is a timing diagrams illustrating a process of a host and a storage controller of the storage system of FIG. 8A, according to an embodiment.

In some exemplary embodiments, different to the example illustrated in FIG. 8B, when the first time point Tcp lags behind the second time point Tci, the timing controller 111b may request the latency calculator 111a to calculate a third time point. The third time point may lag behind the first time point Tcp and the second time point Tci. The third time point may be calculated based on the interval latency IL.

For example, the latency calculator 111a may calculate the third time point by adding a time period corresponding to interval latency IL from a time point to write a specific command (not illustrated) that is written after the previous completion COMPx. When the third time point lags behind the first time point, the timing controller 111b may determine the third time point as the timing to write the completion COMP. In other words, the storage controller 110 may hold the completion COMP until the third time point.

As described above, according to an embodiment, a storage system in which the processing latency PL and the interval latency IL are generated by the host 10 and the completion COMP is written at the timing determined based on the processing latency PL and the interval latency IL may be provided.

FIG. 8B is a timing diagrams illustrating a process of a host and a storage controller of the storage system performing the operation method of FIG. 8A, according to an embodiment. Referring to FIGS. 8A and 8B, the host 10 may sequentially perform the following: generating the processing latency PL and the interval latency IL, writing the command CMD into the submission queue SQ, and outputting the submission queue SQ doorbell indicating that the command CMD is written.

The storage controller 110 may write the previous completion COMPx at the previous completion time point Tcx. The storage controller 110 may sequentially perform the following: receiving the submission queue SQ doorbell, fetching the command CMD, and processing data requested by the command CMD based on the direct memory access transfer.

The storage controller 110 may determine the timing to write the completion COMP, based on the processing latency PL and the interval latency IL. The storage controller 110 may calculate a processing completion time point Tcp by adding a time period corresponding to the processing latency PL from the fetch time point Tf when the command CMD is fetched from the submission queue SQ. The storage controller 110 may calculate an interval completion time point Tci by adding a time period corresponding to the interval latency IL from the previous completion time point Tcx.

In an exemplary embodiment, the storage controller 110 may determine the timing to write the completion COMP, based on the processing completion time point Tcp and the interval completion time point Tci. For example, when the interval completion time point Tci lags behind the processing completion time point Tcp, the storage controller 110 may determine the interval completion time point Tci as the timing to write the completion COMP. This is illustrated in the example of FIG. 8B.

However, unlike the example illustrated in FIG. 8B, when the processing completion time point Tcp is the same as the interval completion time point Tci, the storage controller 110 may determine the processing completion time point Tcp as to timing to write the completion COMP. Also, unlike the example illustrated in FIG. 8B, when the processing completion time point Tcp lags behind the interval completion time point Tci, the storage controller 110 may determine a time period, which is obtained by adding the time period corresponding to the interval latency IL from a time point to write a specific completion (not illustrated) written after the previous completion COMPx, as the timing to write the completion COMP. The storage controller 110 may write the completion COMP at time point Tci thus determined (in the example illustrated in FIG. 8B).

The storage controller 110 may output an interrupt after the storage controller 110 writes the completion COMP into the completion queue CQ at the completion time point Tci (in the example illustrated in FIG. 8B). The host 10 may receive the interrupt and process the completion COMP written into the completion queue CQ after receiving the interrupt. The host 10 may output the completion queue CQ doorbell and the storage controller 110 may receive the CQ doorbell.

Figure 9:
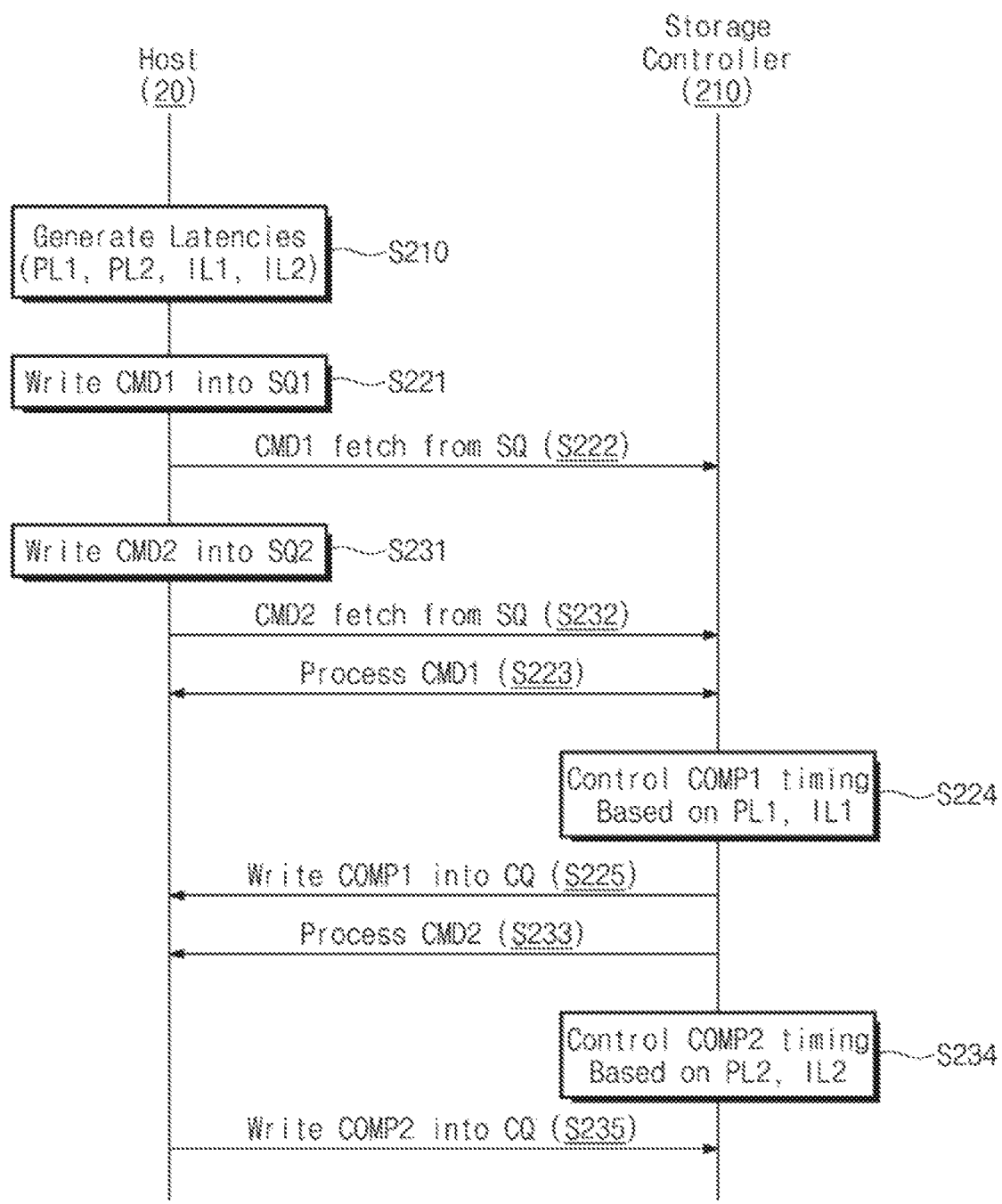
FIG. 9 is a flowchart illustrating an operating method of a storage system according to an embodiment.

FIG. 9 is a flowchart illustrating an operating method of a storage system according to an embodiment. An operating method of a storage system including a host 20 and a storage controller 210 is exemplified in FIG. 9.

In operation S210, the host 20 may generate a first processing latency PL1 and a second processing latency PL2 and a first interval latency IL1 and a second interval latency IL2. The first processing latency PL1 and the first interval latency IL1 are latencies corresponding to a first command CMD1. The second processing latency PL2 and the second interval latency IL2 are latencies corresponding to a second command CMD2.

In an exemplary embodiment, the first command CMD1 may be processed prior to the second command CMD2. For example, the first command CMD1 may be fetched prior to the second command CMD2. A first completion COMP1 corresponding to the first command CMD1 may be written prior a second completion COMP2 corresponding to the second command CMD2. The first interval latency IL1 may correspond to an interval from a time point when another completion written prior to the first completion COMP1 is written to a time point to write the first completion COMP1. The second interval latency IL2 may correspond to an interval from a time point when the first completion COMP1 is written to a time point to write the second completion COMP2.

In operation S221, the host 20 may write the first command CMD1 including the first processing latency PL1 and the first interval latency IL1 into the submission queue SQ. In operation S222, the storage controller 210 may fetch the first command CMD1 written into the submission queue SQ.

In operation S231, the host 20 may write the second command CMD2 including the second processing latency PL2 and the second interval latency IL2 into the submission queue SQ. In operation S232, the storage controller 210 may fetch the second command CMD2 written into the submission queue SQ.

In operation S223, the storage controller 210 may process data, which the first command CMD1 requests, based on the direct memory access transfer. In operation S224, the storage controller 210 may determine the timing to write the first completion COMP1 based on the first processing latency PL1 and the first interval latency IL'. The first completion COMP1 may indicate that the first command CMD1 is completely processed. In operation S225, the storage controller 210 may write the first completion COMP1 into the completion queue CQ, based on the timing determined in operation S224.

In operation S233, the storage controller 210 may process data, which the second command CMD2 requests, based on the direct memory access transfer. In operation S234, the storage controller 210 may determine the timing to write the second completion COMP2 based on the second processing latency PL2 and the second interval latency IL2. The second completion COMP2 may indicate that the second command CMD2 is completely processed. In operation S235, the storage controller 210 may write the second completion COMP2 into the completion queue CQ, based on the timing determined in operation S234.

As described above, according to an embodiment, an operating method of a storage system in which the host 20 generates latencies PL1, PL2, IL', and IL2 associated with different commands CMD1 and CMD2, the first completion COMP1 is written into the completion queue CQ at the timing determined based on the first processing latency PL1 and the first interval latency ILL and the second completion COMP2 is written into the completion queue CQ at the timing determined based on the second processing latency PL2 and the second interval latency IL2 may be provided.

Figure 10:
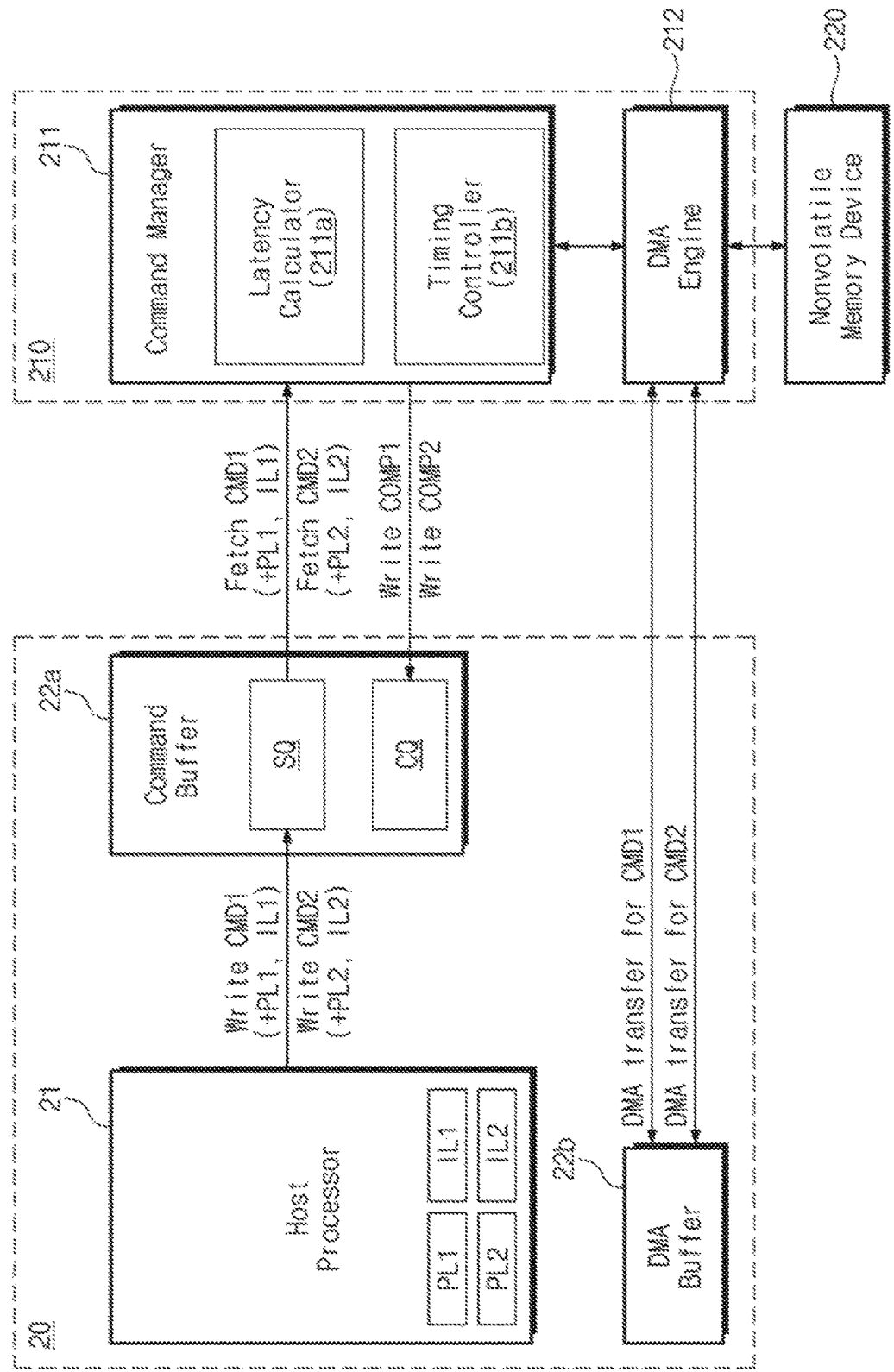
FIG. 10 is a block diagram illustrating the storage system performing the operating method of FIG. 9, according to an embodiment.

FIG. 10 is a block diagram illustrating a storage system performing an operating method of FIG. 9, according to an embodiment. A storage system that determines timings to write different completions COMP1 and COMP2 respectively corresponding to different commands CMD1 and CM2 is exemplified in FIG. 10. Characteristics of a DMA buffer 22b, a DMA engine 212, and a nonvolatile memory device 220 are similar to the characteristics of the DMA buffer 12b, the DMA engine 112, and the nonvolatile memory device 120 of FIG. 6A, and thus, repeated description will be omitted for conciseness and to avoid redundancy.

The host 20 may include a host processor 21, a command buffer 22a, and the DMA buffer 22b. The host processor 21 may generate the first processing latency PL1 and the first interval latency IL1 including information about a timing to process the first command CMD1 and a timing to write the first completion COMP1. The host processor 21 may generate the second processing latency PL2 and the second interval latency IL2 including information about a timing to process the second command CMD2 and a timing to write the second completion COMP2.

The host processor 21 may write the first command CMD1 including the first processing latency PL1 and the first interval latency IL1 into the submission queue SQ. A command manager 211 may fetch the first command CMD1 written into the submission queue SQ. The host processor 21 may write the second command CMD2 including the second processing latency PL2 and the second interval latency IL2 into the submission queue SQ. The command manager 211 may fetch the second command CMD2 written into the submission queue SQ.

The command manager 211 may request the DMA engine 212 to process data associated with the first command CMD1. When the data associated with the first command CMD1 are completely processed, the command manager 211 may write the first completion COMP1 indicating that the data associated with the first command CMD1 are completely processed into the completion queue CQ according to a timing based on the first processing latency PL1 and the first interval latency IL1 as discussed above.

The command manager 211 may request the DMA engine 212 to process data associated with the second command CMD2. When the data associated with the second command CMD2 are completely processed, the command manager 211 may write the second completion COMP2 indicating that the data associated with the second command CMD2 are completely processed into the completion queue CQ according to a timing based on the second processing latency PL2 and the second interval latency IL2 as discussed above.

Figure 11:
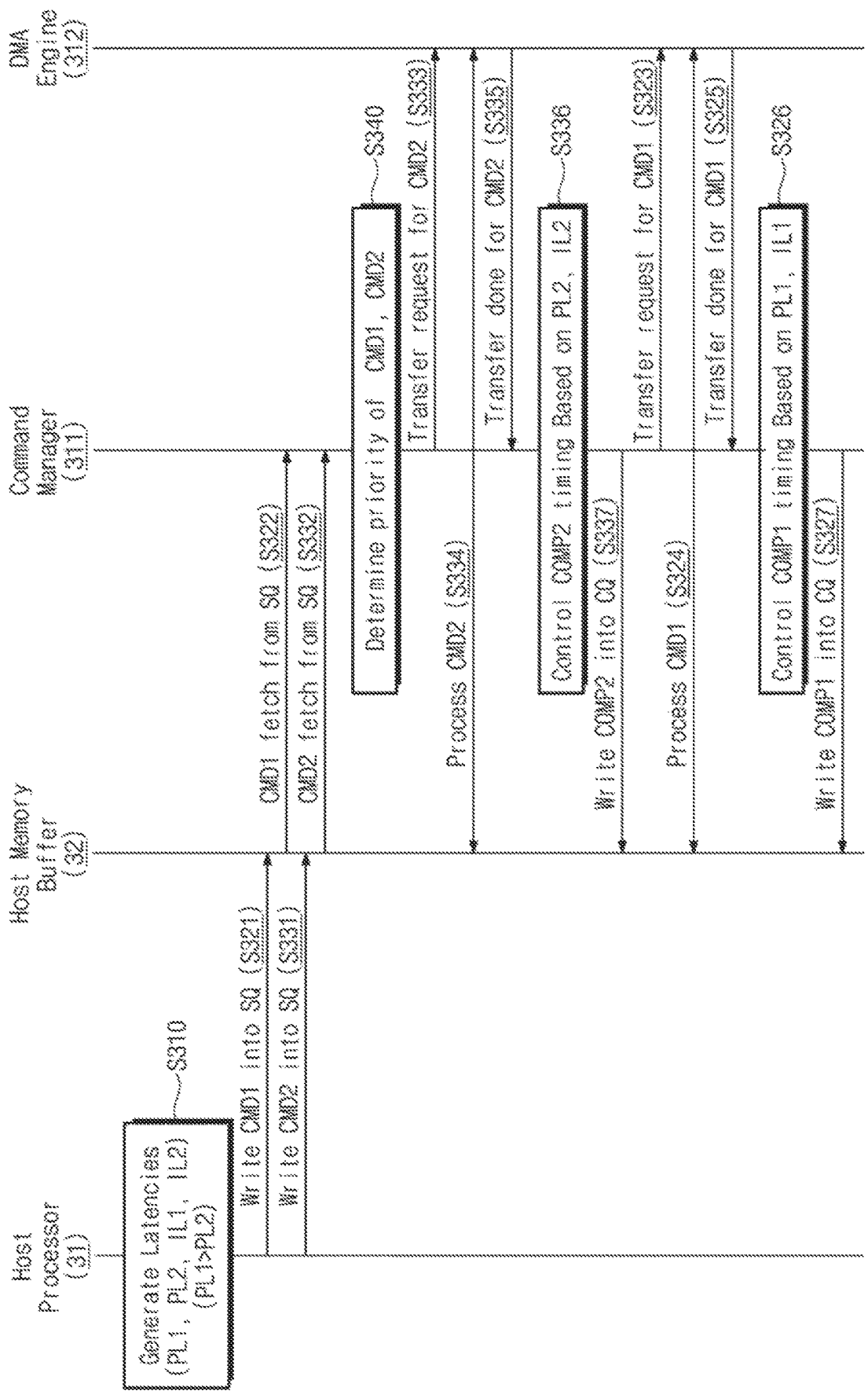
FIG. 11 is a flowchart illustrating an operating method of a storage system according to an embodiment.

FIG. 11 is a flowchart illustrating an operating method of a storage system according to an embodiment. An operating method of a storage system including a host processor 31, a host memory buffer 32, a command manager 311, and a DMA engine 312 is exemplified in FIG. 11.

In operation S310, the host processor 31 may generate the first and second processing latencies PL1 and PL2 and the first and second interval latencies IL1 and IL2. In this case, a time period corresponding to the first processing latency PL1 may be longer than a time period corresponding to the second processing latency PL2. That is, a time period taken to process the first command CMD1 may be longer than a time period taken to process the second command CMD2.

In operation S321, the host processor 31 may write the first command CMD1 including the first processing latency PL1 and the first interval latency IL1 into the submission queue SQ of the host memory buffer 32. In operation S322, the command manager 311 may fetch the first command CMD1 written into the submission queue SQ.

In operation S331, the host processor 31 may write the second command CMD2 including the second processing latency PL2 and the second interval latency IL2 into the submission queue SQ of the host memory buffer 32. In operation S332, the command manager 311 may fetch the second command CMD2 written into the submission queue SQ. In this case, operation S332 may be performed after operation S322. That is, the command manager 311 may fetch the first command CMD1 and may then fetch the second command CMD2.

In operation S340, the command manager 311 may generate priorities of the first and second commands CMD1 and CMD2 based on the first and second processing latencies PL1 and PL2. The priorities of the first and second commands CMD1 and CM2 may indicate which of the first and second commands CMD1 and CMD2 is first processed.

In an exemplary embodiment, the command manager 311 may determine a priority such that a command corresponding to a processing latency of a relatively short time period is first processed. For example, in the case where time periods corresponding to the first and second processing latencies PL1 and PL2 are 100 μs 10 μs, respectively, the command manager 311 may determine the second command CMD2 as a command to be processed prior to the first command CMD1. In other words, the command manager 311 may determine the second command CMD2 to be processed first from among the first command CMD1 and the second command CMD2 based on the first and second processing latencies PL1 and PL2.

In an exemplary embodiment, the order of processing the first and second commands CMD1 and CMD2 may be determined based on the priorities determined in operation S340. For example, when a time period corresponding to the second processing latency PL2 is shorter than a time period corresponding to the first processing latency PL1 (as in the example illustrated in FIG. 11), operation S333 to operation S337 in which the second command CMD2 is processed may be performed prior to operation S323 to operation S327 in which the first command CMD1 is processed. That is, based on the determined priorities, data associated with the second command CMD2 fetched after the first command CMD1 may be processed prior to data associated with the first command CMD1.

For example, unlike in the example illustrated in FIG. 11, when the time period corresponding to the first processing latency PL1 is shorter than the time period corresponding to the second processing latency PL2 (i.e., PL1<PL2), operation S323 to operation S327 in which the first command CMD1 is processed may be performed prior to operation S333 to operation S337 in which the second command CMD2 is processed. That is, based on the determined priorities, the data associated with the first command CMD1 may be processed prior to the data associated with the second command CMD2.

Returning to FIG. 11, in operation S333, the command manager 311 may request the DMA engine 312 to process the data associated with the second command CMD2. In operation S334, the DMA engine 312 may process data, which the second command CMD2 requests, based on the direct memory access transfer. In operation S335, the DMA engine 312 may inform the command manager 311 that the data associated with the second command CMD2 are completely processed.

In operation S336, the command manager 311 may determine the timing to write the second completion COMP2 based on the second processing latency PL2 and the second interval latency IL2. In operation S337, the command manager 311 may write the second completion COMP2 into the completion queue CQ of the host memory buffer 32, based on the timing determined in operation S336.

In operation S323, the command manager 311 may request the DMA engine 312 to process the data associated with the first command CMD1. In operation S324, the DMA engine 312 may process data, which the first command CMD1 requests, based on the direct memory access transfer. In operation S325, the DMA engine 312 may inform the command manager 311 that the data associated with the first command CMD1 are completely processed.

In operation S326, the command manager 311 may determine the timing to write the first completion COMP1 based on the first processing latency PL1 and the first interval latency IL'. In operation S327, the command manager 311 may write the first completion COMP1 into the completion queue CQ of the host memory buffer 32, based on the timing determined in operation S326.

As described above, according to an embodiment, an operating method of a storage system that determines a command to be processed first from among the commands CMD1 and CMD2 (i.e., a priority of the commands CMD1 and CMD2) based on the processing latencies PL1 and PL2 may be provided.

Figure 12:
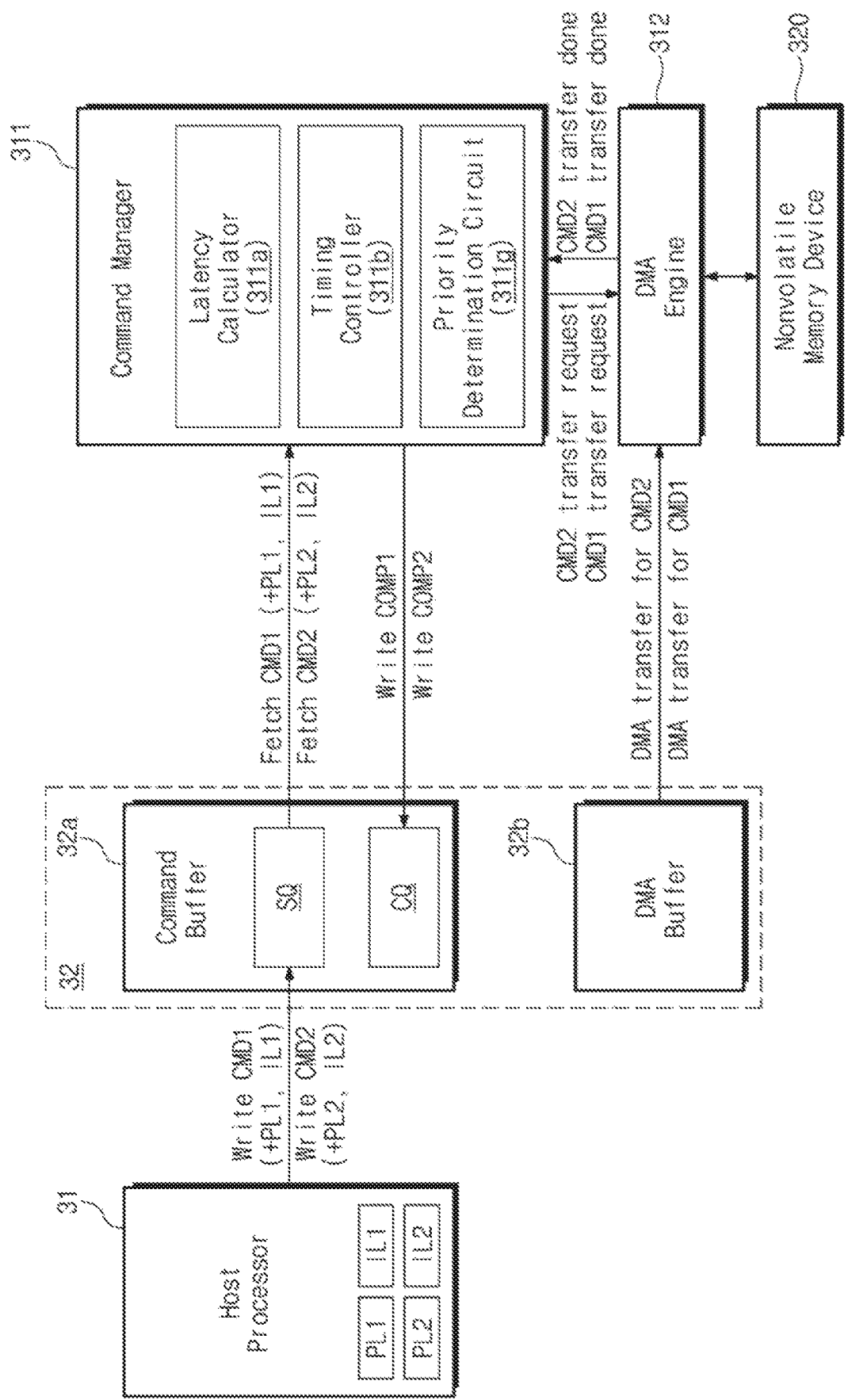
FIG. 12 is a block diagram illustrating the storage system performing the operating method of FIG. 11, according to an embodiment.

FIG. 12 is a block diagram illustrating a storage system performing an operating method of FIG. 11, according to an embodiment. An operating method of a storage system that determines a command to be first processed from among the commands CMD1 and CMD2 based on the processing latencies PL1 and PL2 is exemplified in FIG. 12.

The storage system may include the host processor 31, the host memory buffer 32, the command manager 311, and the DMA engine 312. The host memory buffer 32 may include a command buffer 32a and a DMA buffer 32b. Characteristics of the DMA buffer 32b, the DMA engine 312, and a nonvolatile memory device 320 are similar to the characteristics of the DMA buffer 12b, the DMA engine 112, and the nonvolatile memory device 120 of FIG. 6A, and thus, repeated description will be omitted for conciseness and to avoid redundancy.

The host processor 31 may generate the first and second processing latencies PL1 and PL2 and the first and second interval latencies IL1 and IL2 associated with the first and second commands CMD1 and CMD2. In this case, a time period corresponding to the second processing latency PL2 may be shorter than a time period corresponding to the first processing latency PL1 (i.e., PL1>PL2).

The host processor 31 may write the first command CMD1 including the first processing latency PL1 and the first interval latency IL1 into the submission queue SQ. The command manager 311 may fetch the first command CMD1 from the submission queue SQ. The host processor 31 may write the second command CMD2 including the second processing latency PL2 and the second interval latency IL2 into the submission queue SQ. The command manager 311 may fetch the second command CMD2 from the submission queue SQ.

The command manager 311 may include a latency calculator 311a, a timing controller 311b, and a priority determination circuit 311g. The priority determination circuit 311g may determine a command to be first processed from among the first and second commands CMD1 and CMD2 based on the first and second processing latencies PL1 and PL2.

For example, the priority determination circuit 311g may compare time periods respectively corresponding to the first and second processing latencies PL1 and PL2. The priority determination circuit 311g may determine the second command CMD2 corresponding to a processing latency of a relatively short time period as a command to be processed prior to the first command CMD1. In this example, since PL1>PL2, the priority determination circuit 311g may determine to process the second command CMD2 first, before processing the first command CMD1.

Figure 13:
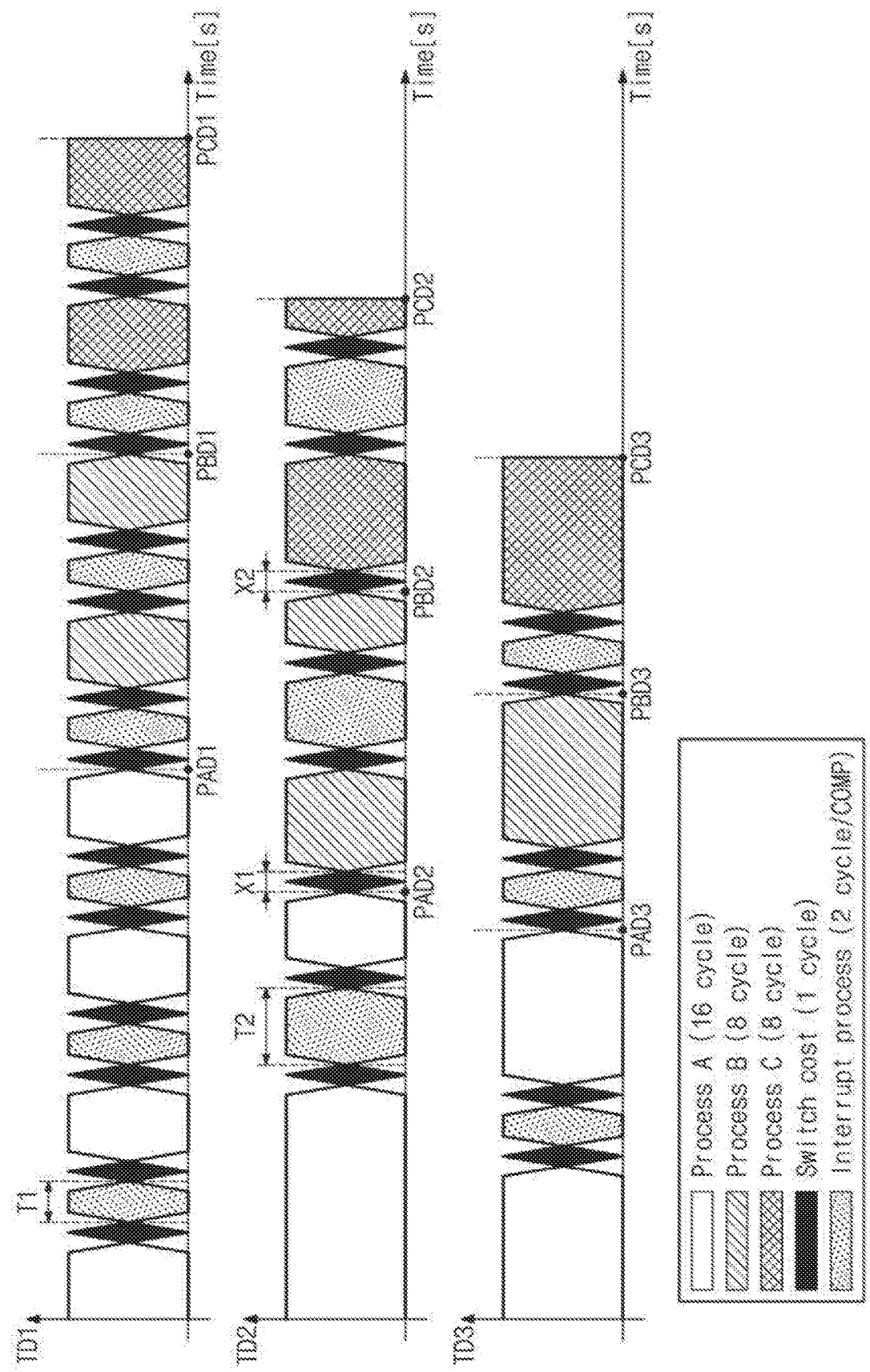
FIG. 13 is a timing diagram illustrating a process of a host according to an embodiment.

FIG. 13 is a timing diagram illustrating a process of a host according to an embodiment. Timing diagrams TD1, TD2, and TD3 illustrating processes that a host processor performs depending on different completion control methods are exemplified in FIG. 13.

Process "A" to process "C" may be processes that are not associated with writing a command and processing a completion and that the host processor performs separately. A switch cost may mean a time period that is taken to switch a process that the host processor performs. An interrupt process may mean a process in which the host processor processes a completion written into a completion queue in response to an interrupt.

The first timing diagram TD1 illustrates processes the host processor performs in a related art storage system. In this case, a timing when a completion is written may not be determined based on a latency. The host processor may process a completion periodically every "8" cycles. The overall performance of the host processor may decrease due to the burden on completion processing.

The second timing diagram TD2 illustrates processes that a host processor of a storage system merging and processing a plurality of completions performs in a related art storage system. As a plurality of completions are merged and processed, a time period T2 of the second timing TD2, during which a completion is processed, may be longer than a time period T1 of the first timing TD1, during which a completion is processed. However, because it is possible to shorten an unnecessary switch cost, the host processor to which the second timing diagram TD2 is applied may process a process "A" to a process "C" more quickly than the host processor to which the first timing diagram TD1 is applied.

The third timing diagram TD3 illustrates processes that a host processor of a storage system managing a completion timing based on a latency performs, according to various example embodiments. In the case of the second timing diagram TD2, because there are processed completions merged without consideration of a process that the host processor performs, process "A" to process "C" may be delayed and processed, and unnecessary switch costs X1 and X2 may occur.

The host processor to which the third timing diagram TD3 is applied may process a completion at the timing determined based on a latency, and thus, the occurrence of the unnecessary switch costs X1 and X2 may be suppressed. Also, because the influence of completion processing on process "A" to process "C" is minimized, the host processor to which the third timing diagram TD3 is applied may process a process "A" to a process "C" more quickly than the host processor to which the second timing diagram TD2 is applied.

In an exemplary embodiment, a storage system that controls a completion timing based on a latency and merges and processes a plurality of completions may be provided. For example, referring to the third timing diagram TD3, a plurality of completions may be merged and processed after a time point PCD3 when process "C" is completed. According to the above description, as there is improved a speed at which process "A" to process "C" are processed and there are merged and processed completions not processed within a time period where a process to be processed is absent, a storage system capable of minimizing the occurrence of a switch cost and improving overall performance may be provided.

According to various embodiments, a storage controller managing a completion timing such that a completion is written at a timing determined based on latency information of a host, and an operating method thereof are provided.

Also, according to various embodiments, a storage controller in which the timing to write a completion is controlled and the influence of completion writing on a process to be processed at a host decreases and a process execution speed of the host is improved, and an operating method thereof are provided.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A method of operating a storage controller which is configured to communicate with a host including a submission queue and a completion queue, the method comprising:
   receiving a submission queue doorbell from the host;
   fetching a first command including a latency from the submission queue of the host in response to the received submission queue doorbell;
   processing the fetched first command; and
   writing a first completion, which indicates that the first command is completely processed, into the completion queue of the host at a timing based on the latency,
   wherein the latency includes a processing latency indicating a time period from a time point at which the first command is fetched to a time point at which the first completion is to be written into the completion queue.

2. The method of claim 1, wherein the latency is included in a reserved area of the first command.

3. The method of claim 1, further comprising:
   outputting an interrupt, which indicates that the first completion is written into the completion queue, to the host.

4. The method of claim 3, further comprising:
   writing a second completion, which indicates that a second command different from the first command is completely processed, into the completion queue of the host,
   wherein the interrupt further indicates that the second completion has been written into the completion queue.

5. The method of claim 3, further comprising:
   in response to the interrupt, receiving a completion queue doorbell indicating that the host has processed the first completion that was written into the completion queue.

6. The method of claim 1, wherein, in the processing of the fetched first command, the first command is processed based on a direct memory access (DMA) transfer.

7. The method of claim 1, wherein the first command includes reserved bits for the latency within a body of the first command.

8. The method of claim 1, wherein the latency comprises the processing latency and an interval latency indicating a time interval from one completion to a subsequent completion.

9. A method of operating a storage controller which is configured to communicate with a host including a submission queue and a completion queue, the method comprising:
receiving a submission queue doorbell from the host;
fetching a first command including a latency from the submission queue of the host in response to the received submission queue doorbell;
processing the fetched first command;
writing a first completion, which indicates that the first command is completely processed, into the completion queue of the host at a timing based on the latency;
writing a second completion, which indicates that a second command different from the first command is completely processed, into the completion queue of the host, before writing the first completion into the completion queue,
wherein the latency includes an interval latency indicating a time period from a time point at which the second completion is written to a time point at which the first completion is to be written.

10. The method of claim 9, wherein the latency further includes a processing latency indicating a time period from a time point at which the first command is fetched to the time point at which the first completion is to be written into the completion queue, and
wherein the timing is based on the processing latency and the interval latency.

11. The method of claim 10, wherein, when the processing latency is shorter than the interval latency, the timing is a time point at which the time period corresponding to the interval latency elapses from the time point at which the second completion has been written.

12. The method of claim 10, further comprising:
writing a third completion, which indicates that a third command different from the first command and the second command is completely processed, into the completion queue of the host, after writing the second completion into the completion queue,
wherein, when the processing latency is longer than the interval latency, the timing is a time point at which the time period corresponding to the interval latency elapses from a time point at which the third completion has been written.

13. A method of operating a storage controller which is configured to communicate with a host including a submission queue and a completion queue, the method comprising:
receiving a submission queue doorbell from the host;
fetching a first command including a latency from the submission queue of the host in response to the received submission queue doorbell;
processing the fetched first command; and
writing a first completion, which indicates that the first command is completely processed, into the completion queue of the host according to the latency,
wherein the latency indicates a specific time point at which the first completion is to be written into the completion queue of the host.

14. The method of claim 13, wherein the first command includes reserved bits for the latency within the first command.

15. The method of claim 13, wherein the latency is a processing latency and the first command further includes an interval latency indicating a time interval from one completion to a subsequent completion.

16. The method of claim 13, further comprising:
outputting an interrupt, which indicates that the first completion is written into the completion queue, to the host.

17. The method of claim 16, further comprising:
writing a second completion, which indicates that a second command different from the first command is completely processed, into the completion queue of the host,
wherein the interrupt further indicates that the second completion has been written into the completion queue.

18. The method of claim 16, further comprising:
in response to the interrupt, receiving a completion queue doorbell indicating that the host has processed the first completion that was written into the completion queue.

19. The method of claim 13, wherein, in the processing of the fetched first command, the first command is processed based on a direct memory access (DMA) transfer.

* * * * *